US008155136B2

United States Patent
Lin et al.

(10) Patent No.: US 8,155,136 B2
(45) Date of Patent: Apr. 10, 2012

(54) SINGLE NETWORK INTERFACE CIRCUIT WITH MULTIPLE-PORTS AND METHOD THEREOF

(75) Inventors: Yu-Jen Lin, Yilan County (TW); Ming-Yuh Yeh, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 313 days.

(21) Appl. No.: 12/556,758

(22) Filed: Sep. 10, 2009

(65) Prior Publication Data

US 2010/0067539 A1 Mar. 18, 2010

(30) Foreign Application Priority Data

Sep. 12, 2008 (TW) .............................. 97134972 A

(51) Int. Cl.
*H04L 12/56* (2006.01)
(52) U.S. Cl. ...................................... 370/420; 370/463
(58) Field of Classification Search ........................ None
See application file for complete search history.

(56) References Cited

U.S. PATENT DOCUMENTS

| | | | |
|---|---|---|---|
| 7,743,268 B2* | 6/2010 | Hinosugi et al. .............. | 713/320 |
| 2004/0111535 A1* | 6/2004 | Boucher et al. .............. | 709/250 |
| 2005/0268137 A1* | 12/2005 | Pettey ........................... | 713/400 |
| 2006/0221990 A1* | 10/2006 | Muller et al. ................ | 370/412 |
| 2006/0251120 A1* | 11/2006 | Arimilli et al. .............. | 370/469 |
| 2007/0165663 A1* | 7/2007 | Aloni et al. .................. | 370/420 |
| 2008/0037585 A1* | 2/2008 | Feuerstraeter et al. ....... | 370/468 |
| 2008/0101337 A1* | 5/2008 | Liu .............................. | 370/352 |
| 2008/0285576 A1* | 11/2008 | Teener et al. ................ | 370/403 |
| 2009/0092147 A1* | 4/2009 | Arita et al. .................. | 370/431 |
| 2010/0278223 A1* | 11/2010 | Riveiro et al. .............. | 375/222 |
| 2011/0035459 A1* | 2/2011 | Desai et al. ................. | 709/212 |

* cited by examiner

Primary Examiner — Hassan Phillips
Assistant Examiner — Duc Duong
(74) Attorney, Agent, or Firm — Thomas, Kayden, Horstemeyer & Risley, LLP

(57) ABSTRACT

The invention discloses a single network interface device with multi-ports, the network interface device supports two or more physical network transmission routes to transmit and receive data, and upload the received data into a host through a host interface or download the data waiting to be transmitted to network from the host through the host interface. Therefore, the present invention increases network communication speed and improves host interface bandwidth.

26 Claims, 17 Drawing Sheets

SINGLE NETWORK INTERFACE CIRCUIT WITH MULTIPLE-PORTS AND METHOD THEREOF

CROSS-REFERENCES TO RELATED APPLICATIONS

This non-provisional application claims priority under 35 U.S.C. §119(a) on Patent Application No. 97134972 filed in Taiwan, R.O.C. on Sep. 12, 2008, the entire contents of which are hereby incorporated by reference.

BACKGROUND OF THE INVENTION

1. Field of the Invention

The invention relates to a network interface device and a method thereof, and particularly to a network interface device and a method which is capable of increasing data communication efficiency.

2. Description of the Prior Art

Traditional data transmission and receipt mechanism of network relies on single network port corresponding to single network controller, to transmit and receive data between a host and a network through a host interface, for example, a PCI Express interface.

PCI Express 1.1 is operated at a 2.5 GHz clock rate, and achieves a bandwidth of 250 MB per second in one direction. In other words, both upload and download bandwidths of a PCI Express lane are 250 MB/s. Multiple lanes can be combined in the PCI Express interface to provide a higher bandwidth. Therefore, the bandwidth of a ×8 PCI Express interface is 8 times the bandwidth of a single-lane PCI Express interface, which means the bandwidth is 2 GB/s in one direction. Taking a ×16 PCI Express interface applied in a common display card for another example, the uni-direction bandwidth is 4 GB/s.

However, in both transmission and receipt, data communication speed of a Gigabit Ethernet network interface card is lower than Gigabit/s due to network surroundings. But many Gigabit Ethernet network interface card (NIC) use ×8 PCI-E interface whose bandwidth achieves 2 GB/s. Obviously, still half or more than half of PCI-E bandwidth is not fully used by the network controller. For a present PCI Express 2.0 interface, the clock rate is increased to 5 GHz to double the interface bandwidth which means uni-direction bandwidth of a ×8 PCI Express 2.0 interface achieves 4 GB/s. Accordingly, much more bandwidth is wasted in network communication.

SUMMARY OF THE INVENTION

A network interface controller to process data of a plurality of physical network links is disclosed and comprises a plurality of network ports, to improve network communication efficiency and increase utility rate of interface bandwidth between a host and the network interface controller (NIC).

An embodiment of a network interface controller of the invention comprises a first physical layer circuit for transmitting and receiving first packets through a first network port, a second physical layer circuit for transmitting and receiving second packets through a second network port, a first media access controller, coupled to the first physical layer circuit, for transmitting packets to the first physical layer circuit in accordance with a destination address corresponding to data waiting for transmission and processing received packets from the first physical layer circuit according to a first MAC address, a second media access controller coupled to the second physical layer circuit, for transmitting packets to the second physical layer circuit in accordance with the destination address corresponding to data waiting for transmission, and processing received packets from the second physical layer circuit according to a second MAC address, a data path circuit, coupled to the first and second media access controllers, for receiving data output from the first or second media access controller according to a receipt rule and transmitting data to the first or second media access controller according to a transmission rule; and a host interface controller, coupled to the data path circuit, for receiving data output from the data path circuit and then uploading the data to a host through a host interface (ex: a PCI Express interface), and downloading data from the host through the host interface and then outputting the data to the data path circuit.

According to another embodiment of the invention, the network interface controller comprises a first physical layer circuit for transmitting and receiving packets through a first network port, a second physical layer circuit for transmitting and receiving packets through a second network port, a first buffer, coupled to the first physical layer circuit, comprising a first transmission buffer for temporarily storing packets to be transmitted to the first physical layer circuit, and a first receive buffer for temporarily storing packets received by the first physical layer circuit; a second buffer, coupled to the second physical layer circuit, comprising a second transmission buffer for temporarily storing packets to be transmitted to the second physical layer circuit, and a second receive buffer for temporarily storing packets received by the second physical layer circuit; a data path controller, coupled to the first and second buffers, for receiving packets from the first buffer or the second buffer according to a receive rule and transmitting packets to the first buffer or the second buffer according to a transmission rule, a single media access controller, for generating packets to the data path controller according to data to be transmitted, and filtering packets received by the data path circuit to output the data, and a host interface controller, coupled to the media access controller, for receiving data filtered by the media access controller and then transmitting the data to a host through a host interface, and downloading data from the host through the host interface and then outputting the data to the media access controller.

The present invention further provides a single network interface device. The single network interface device includes a first transceiver for transmitting and receiving packets through a first network line; a second transceiver, for transmitting and receiving packets through a second network line; a first buffer, coupling to the first transceiver, for temporarily storing packets which are waiting to be transmitted to the first transceiver and temporarily storing packets received by the first transceiver; a second buffer, coupling to the second transceiver, for temporarily storing packets which are waiting to be transmitted to the second transceiver and temporarily storing packets received by the second transceiver; and a host interface circuit, coupling to the first and second buffers, for alternatively allowing the first buffer or the second buffer to communicate with a computer host by a host interface.

These and other objectives of the present invention will no doubt become obvious to those of ordinary skill in the art after reading the following detailed description of the preferred embodiment that is illustrated in the various figures and drawings.

DETAILED DESCRIPTION

The preferred embodiments of the invention, the network interface controller are discussed separately.

First Embodiment

Figure 1:
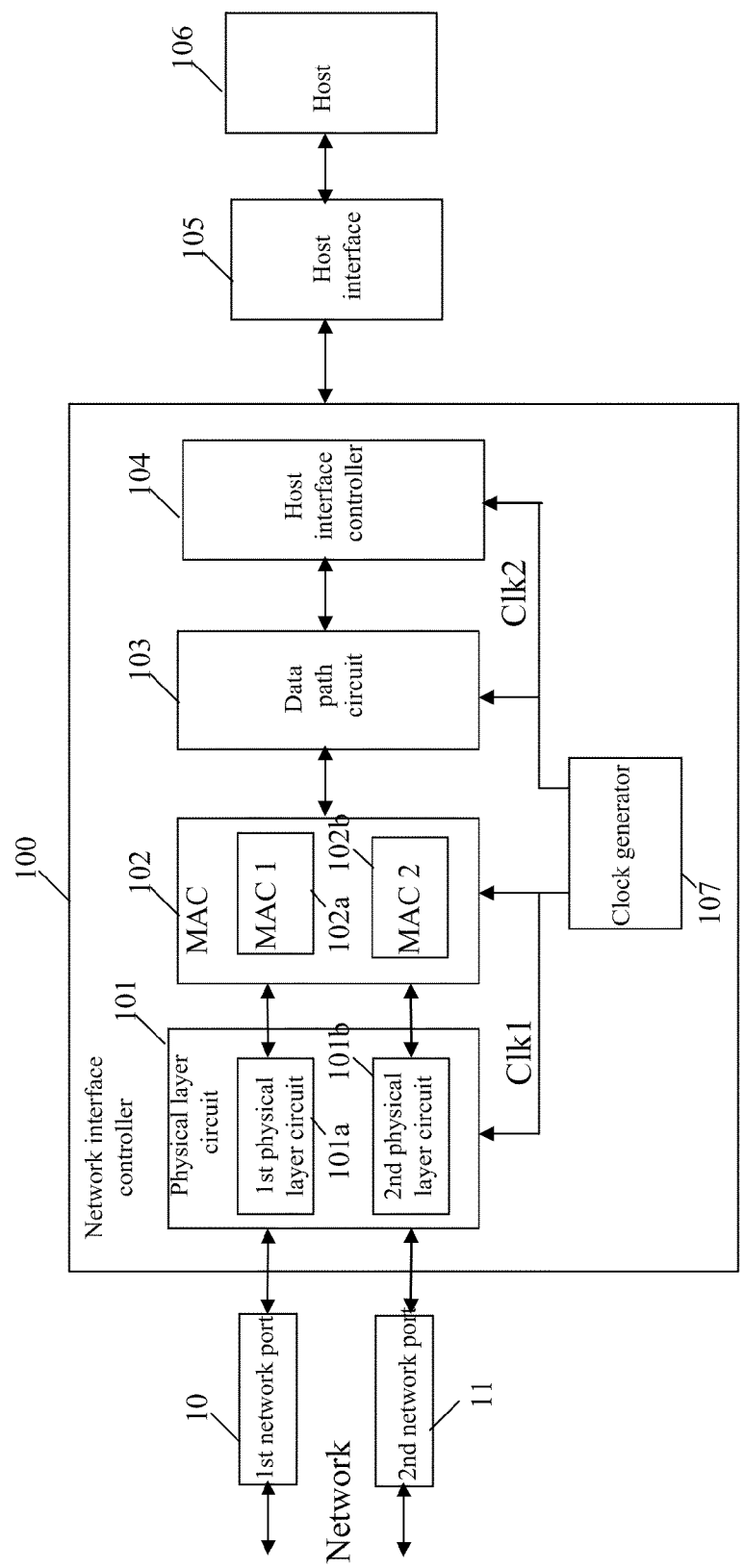
FIG. 1 is a block diagram of an embodiment of the network interface controller disclosed in the invention.

FIG. 1 is a block diagram of an embodiment of the network interface controller disclosed in the invention. The network interface controller 100 comprises a physical layer circuit (PHY) 101, a media access controller (MAC) 102, a data path circuit 103, a host interface controller 104, and a clock generator 107. The physical layer circuit 101 comprises a first physical layer circuit 101a and a second physical layer circuit 101b for respectively transmitting and receiving packets through a first network port 10 and a second network port 11. In this embodiment, the first network port 10 and the second network port 11 are RJ45 connectors. The media access controller 102 comprises a first media access controller 102a and a second media access controller 102b. The first media access controller 102a generates a packet in accordance with a destination address corresponding to data to be transmitted and processes a received packet according to a first MAC address. Similarly, the second media access controller 102b generates a packet in accordance with a destination address corresponding to data to be transmitted and processes a received packet according to a second MAC address. The data path circuit 103 is coupled to the first and second media access controllers 102a, 102b to receive data output from the first and second media access controllers 102a, 102b according to a receive rule and transmit data to the first or second media access controllers 102a, 102b according to a transmission rule. The host interface controller 104 is coupled to the data path circuit 103 and a host interface 105 (ex: PCI Express 1.1 or USB) to receive data output from the data path circuit 103 and upload the data to a host 106 through the host interface 105, and download data from the host 106 through the host interface 105 and then output the data to the data path circuit 103. The clock generator provides a first clock Clk1 to the physical layer circuit 101 and the media access controller 102, and also provides a second clock Clk2 to the data path circuit 103 and the host interface controller 104, wherein frequency of the second clock Clk2 is twice or more than twice of the first clock Clk1.

Figure 2:
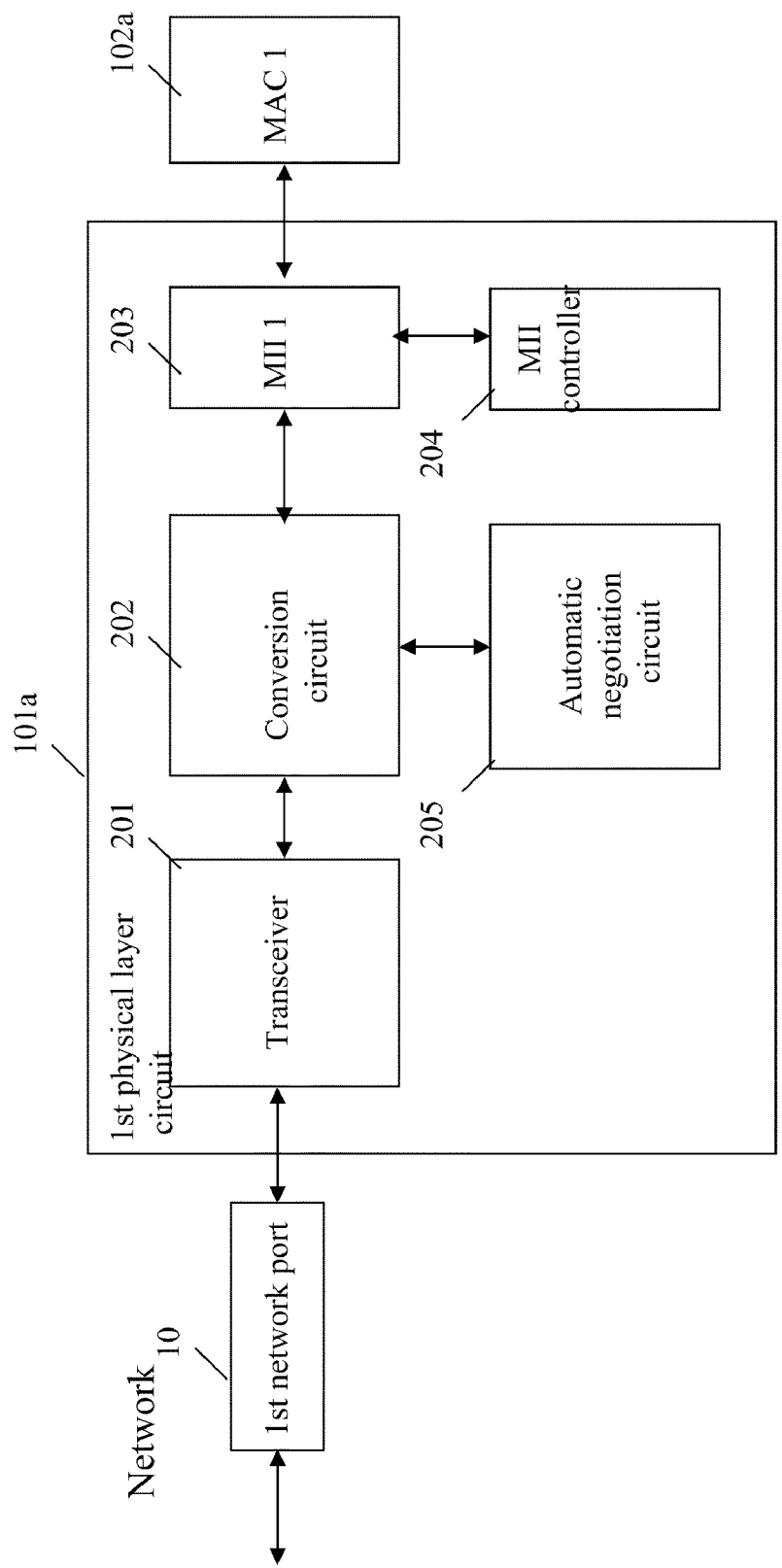
FIG. 2 is a block diagram of an embodiment of the first physical layer circuit shown in FIG. 1.
Figure 3:
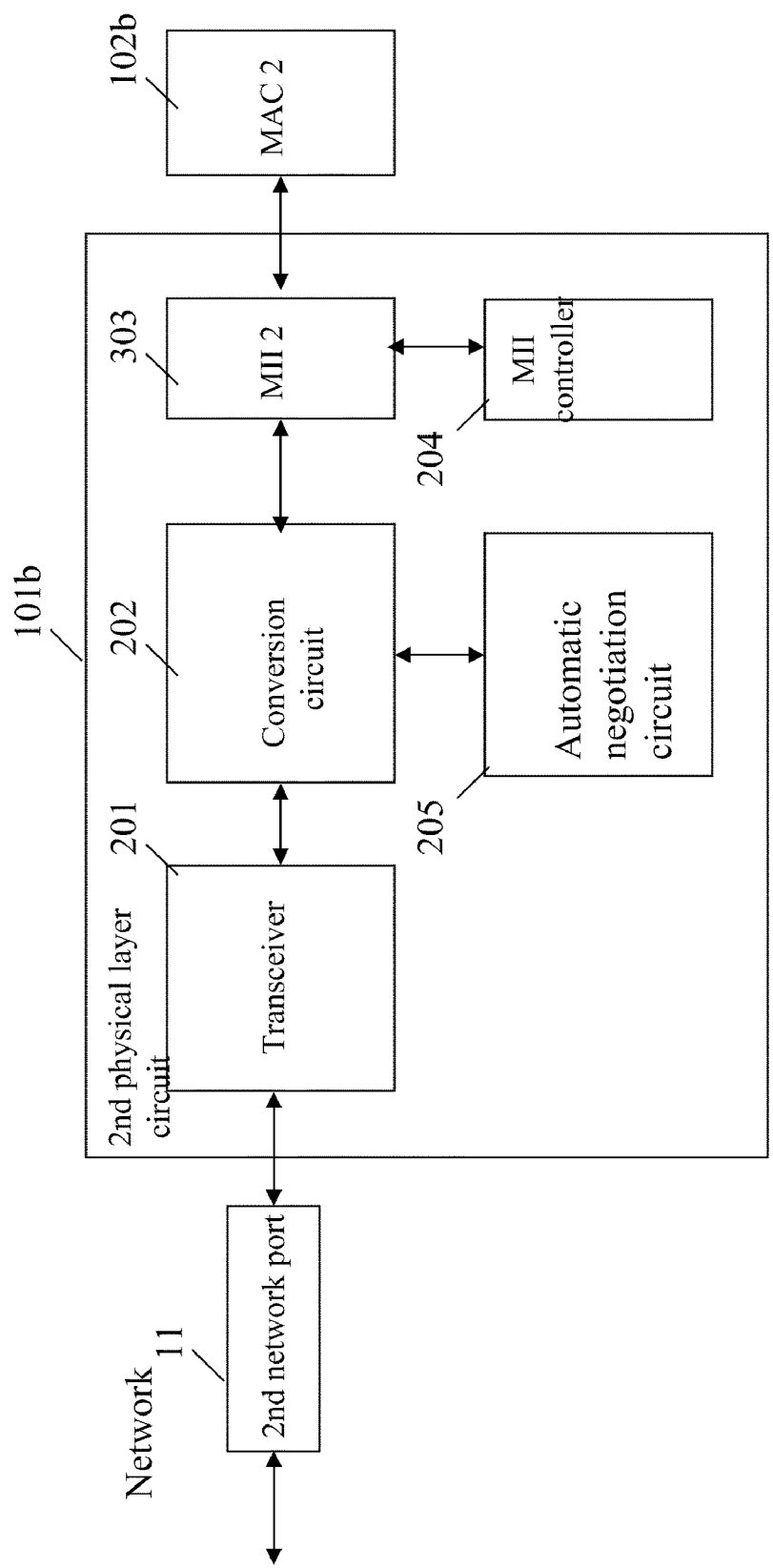
FIG. 3 is a block diagram of an embodiment of the second physical layer circuit shown in FIG. 1.

FIG. 2 is a block diagram of the first physical layer circuit 101a shown in FIG. 1. As shown in FIG. 2, the first physical layer circuit 101a comprises a transceiver 201, a conversion circuit 202, a first media independent interface (MII) 203, a MII controller 204, and an automatic message exchange circuit 205. The transceiver 201 follows IEEE 802.3 standard to transmit and receive packets. The conversion circuit 202 converts packets output from the first media access controller 102a to a proper signal complied with IEEE 802.3 standard and then outputs the signal to a network, and also converts signal received from the network to packets which can be processed by the first media access controller 102a. The first MII 203 is a communication interface of the first physical layer circuit 101a and the first media access controller 102a and controlled by the MII controller 204. The automatic negotiation circuit 205 exchanges information such as transmission rates with an automatic negotiation circuit of another network controller over a network cable. It is noted that the network interface controller 100 of the embodiment is capable of supporting multiple transmission rates, such as 10 Mbit, 100 Mbit, and 1 Gbit. Therefore, the network interface controller 100 of the embodiment works at maximum connection rate if the automatic negotiation circuit 205 confirms that both terminals support the maximum transmission rate. Mechanism of confirming the maximum transmission rate is disclosed in U.S. patents of RE39,116 and RE39,405 and incorporated herein. Furthermore, the structure of the second physical layer circuit 101b is the same as the first physical layer circuit 101a, as shown in FIG. 3 and thus no more description is made.

Figure 4:
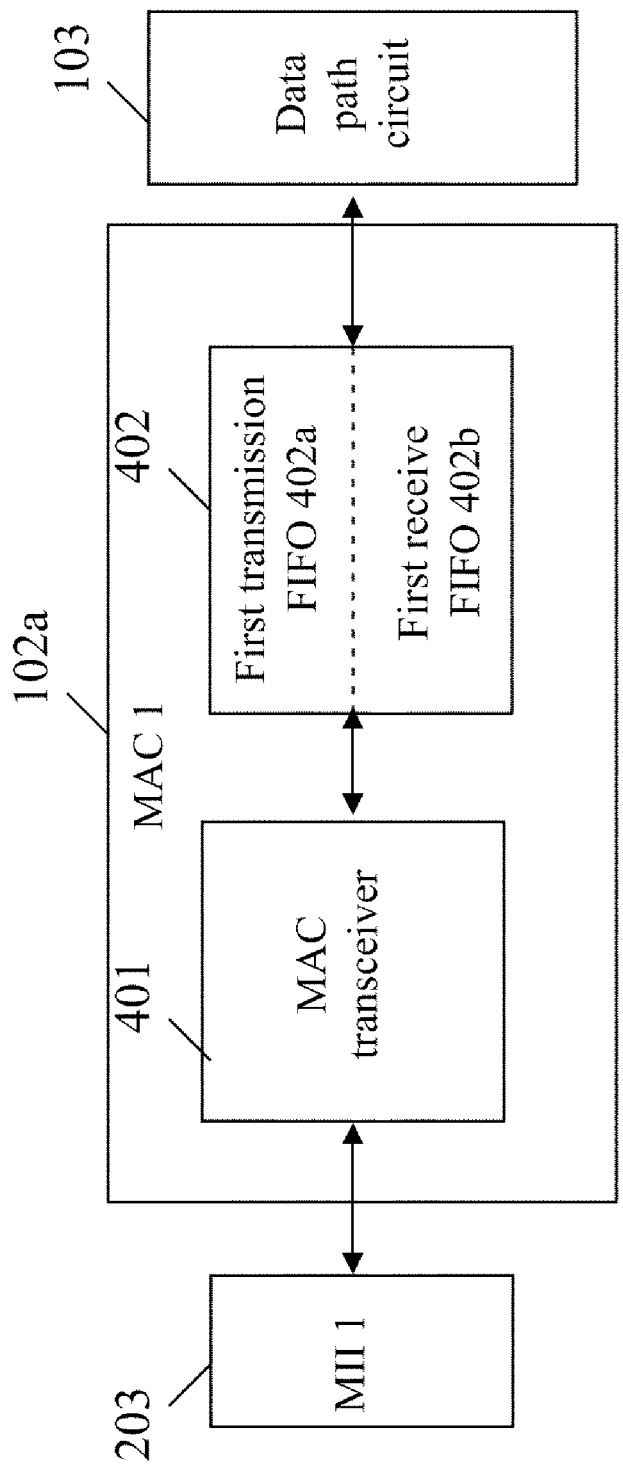
FIG. 4 is a block diagram of an embodiment of the first media access controller in the media access controller shown in FIG. 1.
Figure 5:
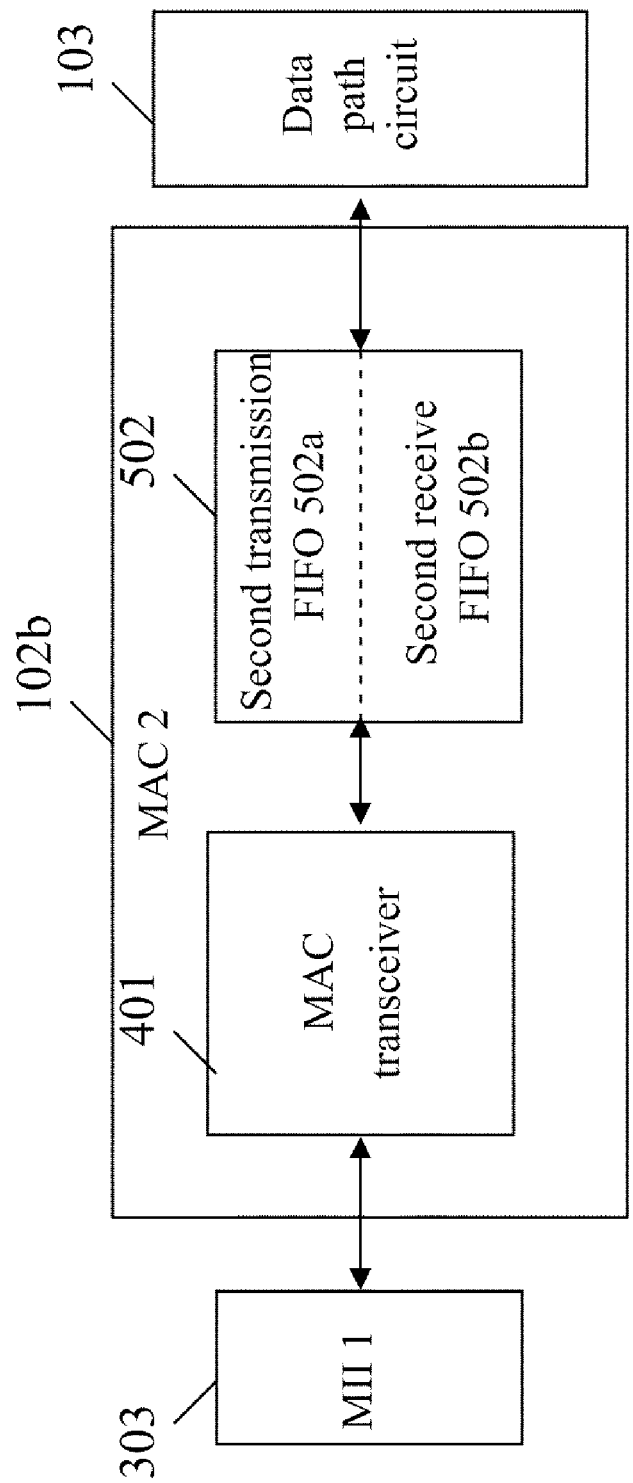
FIG. 5 is a block diagram of an embodiment of the second media access controller in the media access controller shown in FIG. 1.

FIG. 4 is a block diagram of the first media access controller 102a. The first media access controller 102a comprises a MAC transceiver 401 and a first FIFO (first in, first out) buffer 402. The MAC transceiver 401 packetizes data to be transmitted as packets and transmits the packets to the first physical layer circuit 101a through the first media independent interface 203, and further for filters a package received by the first media independent interface 203 to output to the data path circuit 103. The first FIFO buffer 402 couples between the MAC transceiver 401 and the data path circuit 103, and includes a first transmission FIFO 402a for temporarily storing the data waiting to be transmitted and a first receive FIFO 402b for temporarily storing the filtered data. In an embodiment, the first FIFO buffer 402 is an asynchronous FIFO which the access rate between the first FIFO buffer 402 and the MAC transceiver 401 is associated with the first Clk1; and the access rate between the first FIFO buffer 402 and the data path circuit 103 is associated with the first Clk2. The background knowledge of asynchronous FIFO is described in U.S. Pat. Nos. 5,951,635, 6,845,414, and 7,315,600. Additionally, the structure of the second media access controller 102b is the same to the first media access controller 102a, as shown in FIG. 5, so it is not discussed again.

Figure 6:
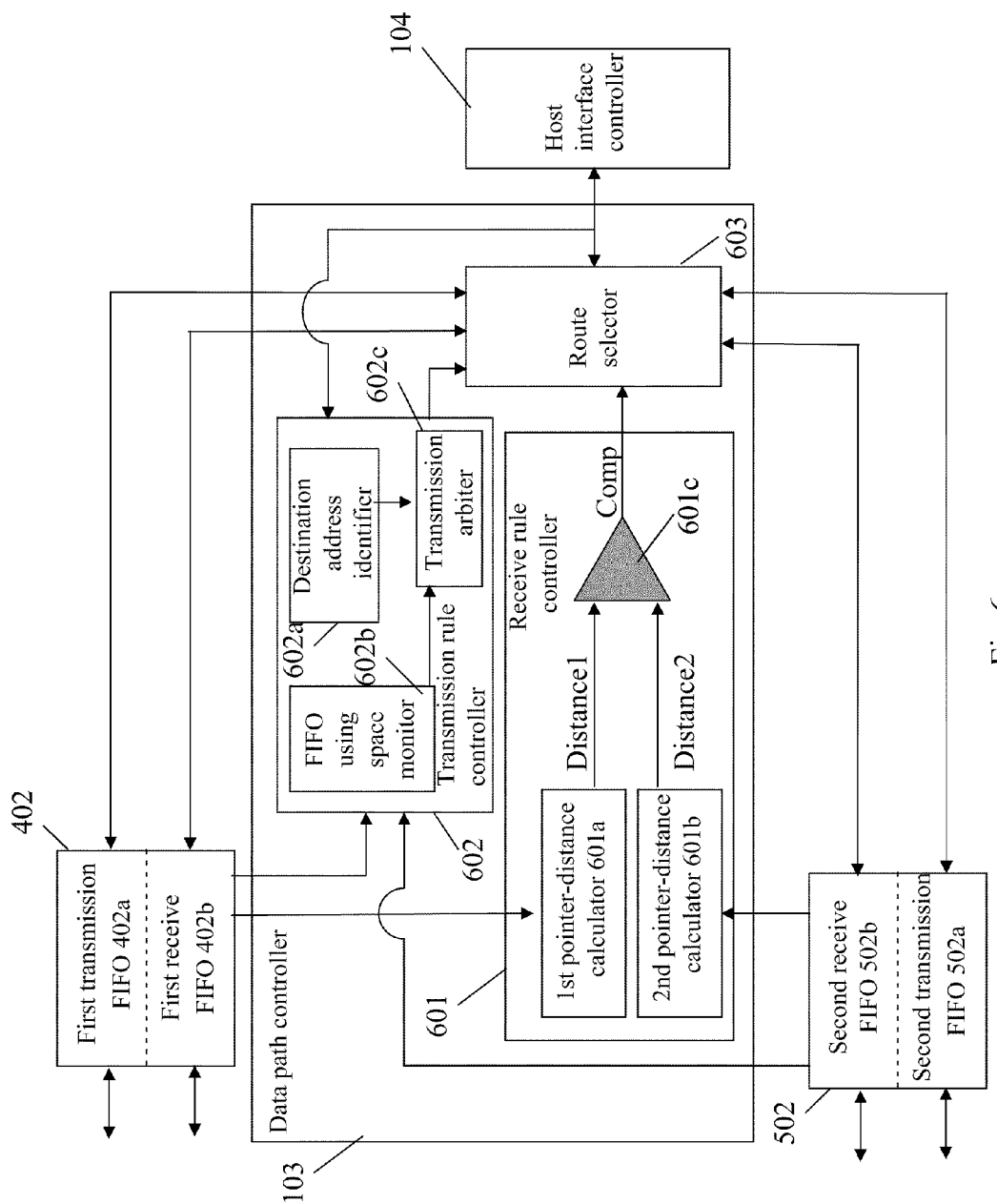
FIG. 6 is a block diagram of an embodiment of the data path circuit shown in FIG. 1.

Please refer to FIG. 6, FIG. 6 is a block diagram of the abovementioned data path circuit 103. The data path circuit 103 includes a receive rule controller 601 for implementing the receive rule. The receive rule controller 601 includes a first pointer-difference calculator 601a, a second pointer-difference calculator 601b, and a used-space comparator 601c. The first pointer-difference calculator 601a calculates difference of the write pointer and the read pointer of the first receive FIFO 402b (named first used space, Distance1, in the following), wherein the write pointer records data amount written into the first receive FIFO 402b and the read pointer records data amount read from the first receive FIFO 402b. As a result, Distance1 represents used space of the first receive FIFO 402b. The second pointer-difference calculator 601b calculates difference of the write pointer and the read pointer of the second receive FIFO (named second used space, Distance2, in the following), wherein Distance2 corresponds to the remaining storage space of the second receive FIFO 502b. The used-space comparator 601c compares Distance1 and Distance2 to generate a comparison signal (named Comp in the following). In this embodiment, Comp is at a first logic level while Distance1 is greater than Distance2; and Comp is at a second logic level vice versa.

Please refer to FIG. 6, the data path circuit 103 further includes a transmission rule controller 602 for implementing the transmission rule. The transmission rule controller 602 includes a destination address identifier 602a, a FIFO using space monitor 602b, and a transmission arbiter 602c. The destination address identifier 602a identifies the destination address of data waiting to be transmitted according to information provided by the host, and further compares the identified address with the previous destination address of transmitted data to generate an identification signal. In this embodiment, the destination address identifier 602a is a look-up-table circuit storing several corresponding destination addresses of the previous transmitted data. When the identification signal is a first digital value, it represents that the destination address of the data waiting to be transmitted is the same as the destination address of the previous data transmitted by the first FIFO 402; when the identification signal is a second digital value, it represents that the destination address of the data waiting to be transmitted is the same as the destination address of the previous data transmitted by the second FIFO 502; and when the identification signal is a third digital value, it represents that the destination address of the data waiting to be transmitted is different to all the destination addresses of the recently transmitted data. The FIFO using space monitor 602b is similar to the receive rule controller 601, the only difference is the FIFO using space monitor 602b compares the write and read pointers of the first transmission FIFO 402a and the second transmission FIFO 502a to generate a monitor signal. When the monitor signal is at first logic level, it represents that the used space of the first transmission FIFO 402a is larger; and when the monitor signal is at second logic level, it represents that the used space of the second transmission FIFO 502a is larger. The transmission arbiter 602c generates a transmission control signal according to the identification signal and the monitor signal. In this embodiment, the transmission control signal is at first logic level in two conditions: the identification signal is a first digital value, or the identification signal is a third digital value and the monitor signal is at second logic level; and the transmission control signal is at second logic level in other two conditions: the identification signal is a second digital value, or the identification signal is a third digital value and the monitor signal is at first logic level. Besides, in another embodiment of this invention, it is allowed to generate the transmission control signal only in accordance with the identification signal of the destination address identifier 602a. When the identification signal is a third digital value, the transmission arbiter 602c can generate the transmission control signal which is at first logic level or second logic level by three types: randomly, in sequence, or in accordance with a preset rule. In another embodiment of this invention, abovementioned address identification is allowed to be executed by the host 106, that is, the host 106 executes address identification according to a driver of the network interface controller 100 of this invention, and provides the identification result to the transmission rule controller 602 through the host interface 105 and the host interface controller 104.

Please still refer to FIG. 6, the data path circuit 103 further includes a route selector 603 coupled to the receive rule controller 601, the transmission rule controller 602, and the host interface controller 104. The route selector 603 couples the first receive FIFO 402b or the second receive FIFO 502b to the host interface controller 104 according to a logic level of Comp, and the host interface controller 104 uploads data to the host 106 from the first receive FIFO 402b or the second receive FIFO 502b through the host interface 105. In this embodiment, when Comp is at first logic level, the route selector 603 couples the first receive FIFO 402b to the host interface controller 104; and when Comp is at second logic level, the route selector 603 couples the second receive FIFO 502b to the host interface controller 104. Furthermore, the route selector 603 couples the host interface controller 104 to the first transmission FIFO 402a or the second transmission FIFO 502a according the transmission control signal from the transmission rule controller 602, such that the host interface controller 104 outputs data waiting to be transmitted to the first transmission FIFO 402a or the second transmission FIFO 502a. In this embodiment, when the transmission control signal is at first logic level, the route selector 603 couples the host interface controller 104 to the first transmission FIFO 402a; when the transmission control signal is at second logic level, the route selector 603 couples the host interface controller 104 to the second transmission FIFO 502a. Additionally, in this embodiment, the route selector 603 is constructed by switch elements. Because switch circuits are known by people skilled in the art, it is not discussed here.

Figure 7:
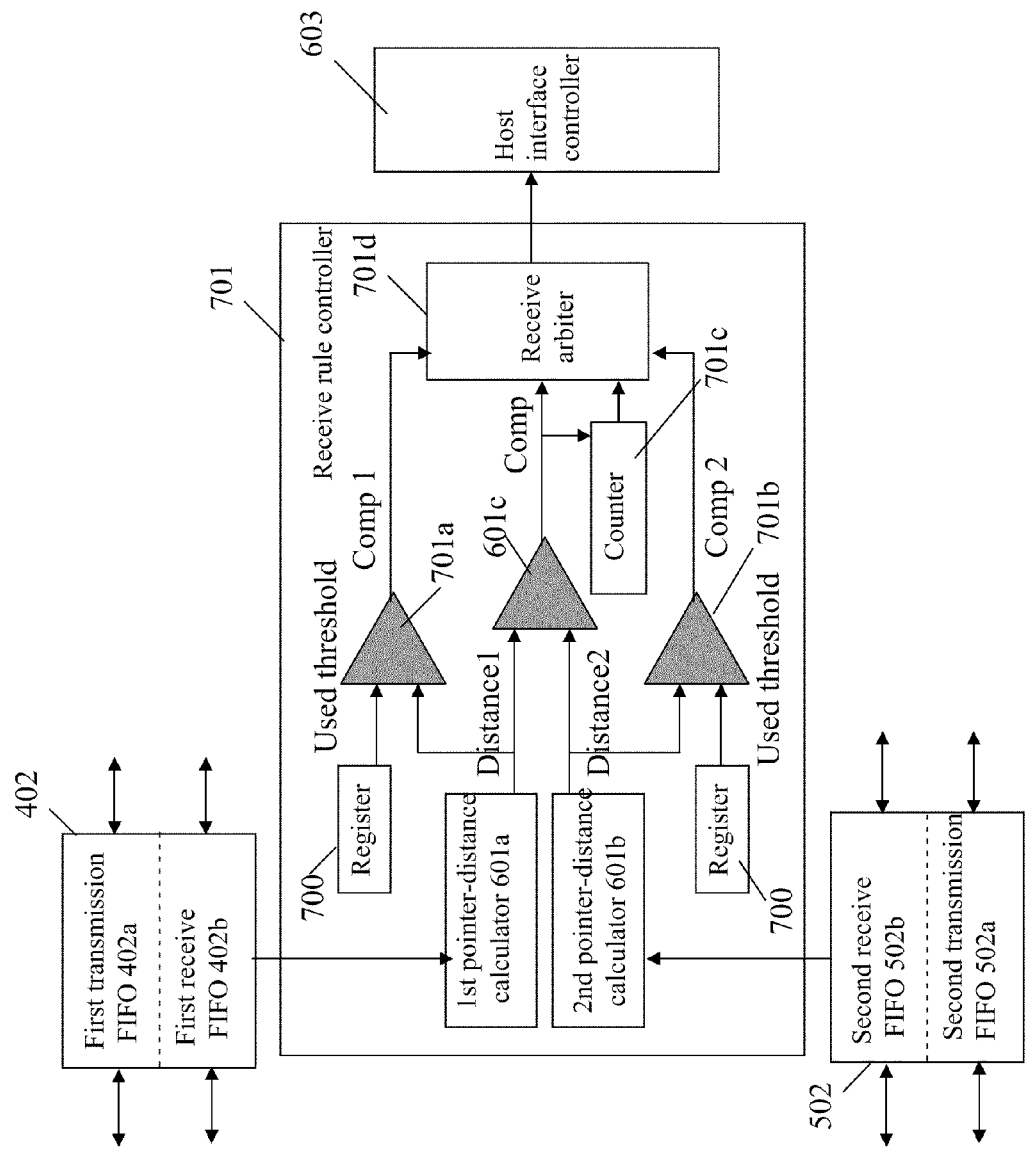
FIG. 7 is a block diagram of another embodiment of the receive rule controller in the data path circuit shown in FIG. 1.

Please refer to FIG. 7, FIG. 7 is a block diagram of another embodiment of the receive rule controller 701 disclosed in this invention. The difference between this embodiment and the receive rule controller 601 of the FIG. 6 is that the receive rule controller 701 further includes a first comparator 701a, a second comparator 701b, a counter 701c, and a receive arbiter 701d. The first comparator 701a compares the first used space Distance1 with a used threshold stored in a register 700 to generate a first comparison signal (Comp1). In this embodiment, if the first used space Distance1 is greater than the used threshold, the first comparison signal is at first logic level; and if the first used space Distance1 is not greater than the used threshold, the first comparison signal is at second logic level. The second comparator 701b compares the second used space Distance2 with the used threshold to generate a second comparison signal (Comp2). In this embodiment, if the second used space Distance2 is greater than the used threshold, the second comparison signal is at first logic level; and if the second used space Distance2 is not greater than the used threshold, the second comparison signal is at second logic level. The counter 701c generates a counting signal in accordance with a preset period, that is, the counting signal transits to second/first logic level from first/second logic level periodically with the preset period. When logic level of the signal Comp changes, the counter 701c is reset and restarts the counting signal from second logic level. The receive arbiter 701d receives the counting signal and signals Comp, Comp1, and Comp2 to generate a receive control signal.

In FIG. 7, If Comp1 or Comp2 is at second logic level, it represents data stored in the first or second receive FIFO 402b, 502b is less or equals to the used threshold (this embodiment sets the used threshold zero). Therefore, the receive arbiter 701d is unnecessarily to refer the counting signal for polling the first and second receive FIFOs 402b, 502b periodically, and it is only necessary to refer Comp to generate the receive control signal for informing the route selector 603 coupling the first receive FIFO 402b or the second receive FIFO 502b to the host interface controller 104. In other words, when Comp is at first/second logic level, it represents only the first/second receive FIFO 402b, 502b having data must be processed, therefore the receive arbiter 701d generates the receive control signal at first/second logic level for making the route selector 603 coupling the first/second receive FIFO 402b/502b to the host interface controller 104. When both Comp1 and Comp2 are at first logic level, it represents data stored in both the first and second receive FIFOs 402b, 502b is greater than the used threshold, therefore the receive arbiter 701d generates the receive control signal according to Comp and the counting signal to inform the route selector 603 coupling the first receive FIFO 402b or the second receive FIFO 502b to the host interface controller 104. That is, the receive control signal couples the second/first receive FIFO 402b, 502b to the host interface controller 104 when Comp transfers to second/first logic level from first/second logic level, and further couples the first/second receive FIFO 402b, 502b to the host interface controller 104 when the counting signal transfers to first logic level from second logic level after the preset period. Through the mechanism, the receive arbiter 701d firstly process one of the first and second receive FIFO 402b, 502b which has more data waiting to be processed according to Comp. Furthermore, the receive arbiter 701d periodically polls the first and second receive FIFO 402b, 502b to check whether they have data waiting to be processed according to the counting signal to avoid waiting too long. Please note that, when signals Comp1 and Comp2 are at second logic level, the operation of the receive arbiter 701d is like an XOR gate to generate the receive control signal according to Comp and the counting signal.

Figure 8:
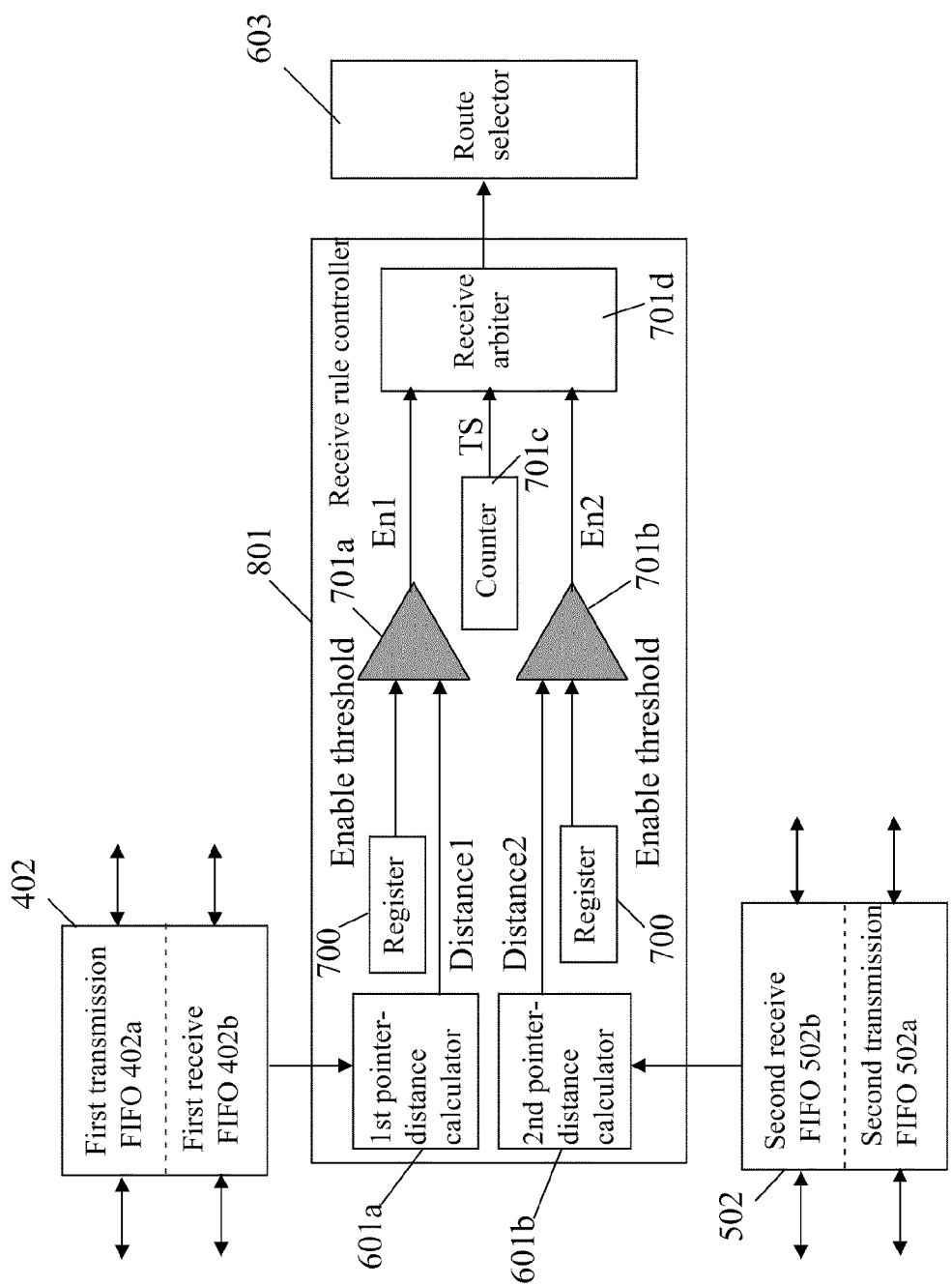
FIG. 8 is a block diagram of another embodiment of the receive rule controller in the data path circuit shown in FIG. 1.
Figure 9:
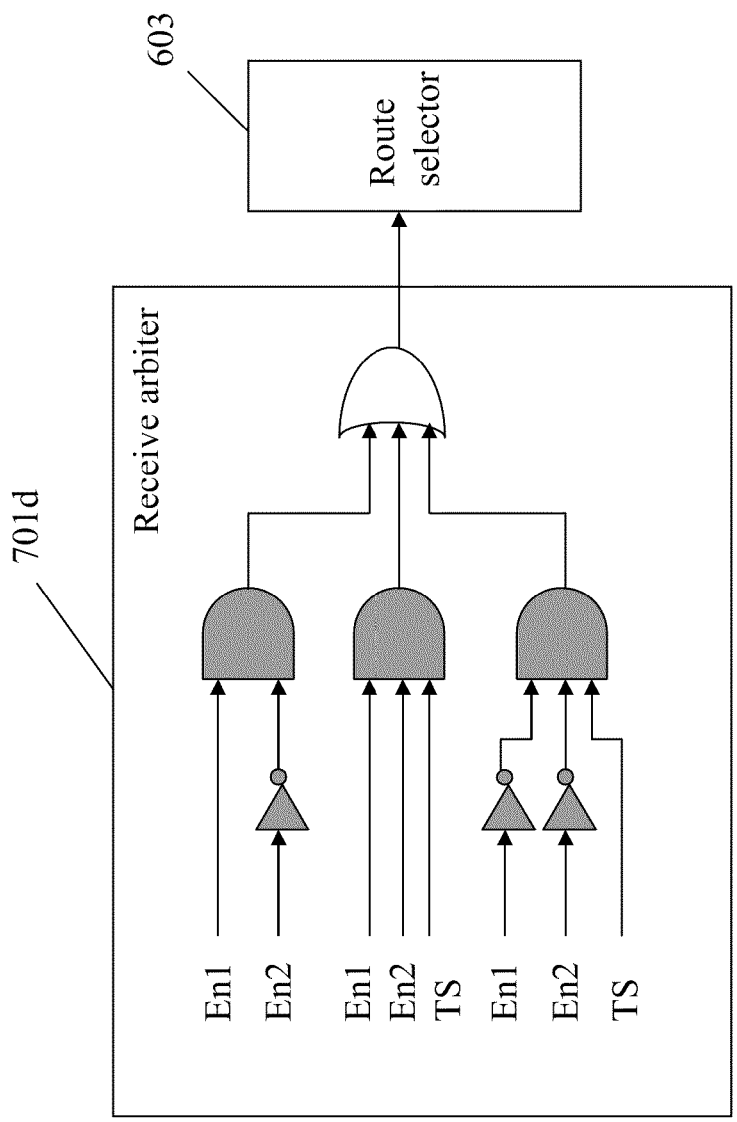
FIG. 9 is a block diagram of another embodiment of the receive arbiter shown in FIG. 8.

Please refer to FIG. 8, FIG. 8 is a block diagram of the receive rule controller for another embodiment. The receive rule controller 801 of this embodiment includes a first pointer-difference calculator 601a discussed above for calculating the first used space Distance1, a second pointer-difference calculator 601b discussed above for calculating the second used space Distance2, a register 700 for storing an enable threshold, a first comparator 701a, a second comparator 701b, a counter 701c discussed above for generating the counting signal, and a receive arbiter 701d. The first comparator 701a compares the first used space Distance1 with the enable threshold to generate a first enable signal (En1). In this embodiment, if the first used space Distance1 is greater than the enable threshold, En1 is at first logic level; and if the first used space Distance1 is not greater than the enable threshold, En1 is at second logic level. The second comparator 701b compares the second used space Distance2 with the enable threshold to generate a second enable signal (En2). In this embodiment, if the second used space Distance2 is greater than the enable threshold, En2 is at first logic level; and if the second used space Distance2 is not greater than the enable threshold, En2 is at second logic level. The receive arbiter 701d, shown as FIG. 9, generates a receive control signal according to En1, En2, and the counting signal TS. Please refer to FIG. 9, in this embodiment, when En1 is at first logic level and En2 is at second logic level, it represents that the first used space Distance1 is greater than the enable threshold and the second used space Distance2 is less than the enable threshold, such that the receive control signal is at first logic level to inform the route selector 603 coupling the host interface controller 104 to the first receive FIFO 402b; when En1 is at second logic level and En2 is at first logic level, it represents that the first used space Distance1 is less than the enable threshold and the second used space Distance2 is greater than the enable threshold, such that the receive control signal is at second logic level to inform the route selector 603 coupling the host interface controller 104 to the second receive FIFO 502b; when both En1 and En2 are at first logic level, if Comp is also at first logic level, it represents that the first used space Distance1 is greater than the second used space Distance2, such that the receive control signal is at first logic level to inform the route selector 603 coupling the host interface controller 104 to the first receive FIFO 402b, but if Comp is at second logic level, it represents that the second used space Distance2 is greater than the first used space Distance1, then the receive control signal informs the route selector 603 coupling the host interface controller 104 to the second receive FIFO 502b; and when both En1 and En2 are at second logic level, the arbiter 701d informs the route selector 603 switching only according to logic level change of the counting signal TS, that is, if the counting signal is at first/second logic level, the route selector 603 couples the host interface controller 104 to the first/second receive FIFO 402b, 502b.

For the sake of avoiding overflow and/or underrun, FIFO includes a monitor circuit for monitoring the using amount of storage space, for example, includes a counter to count how many bytes are stored and how many bytes are read out. Therefore, although the aforementioned embodiment takes counting FIFO read/write pointer difference for example, it is possible to replace the read/write pointer difference with the counting value of the counter. Besides, it is also possible to use different thresholds to compare with the aforementioned first and second used space to achieve other application function. In fact, people skilled in the art can make some changes but still equivalent according to this invention.

In another embodiment, it achieves load balance of the first receiver 201 in the first physical layer circuit 101a and the second receiver 201 in the second physical layer circuit 101b. For example, the transmission rule includes steps of giving priority to one of the first and second receivers 201 which has fewer throughputs to transmit data. In practice, the devices discussed above may be a network interface card (NIC) or a LAN on motherboard (LOM).

Figure 10:
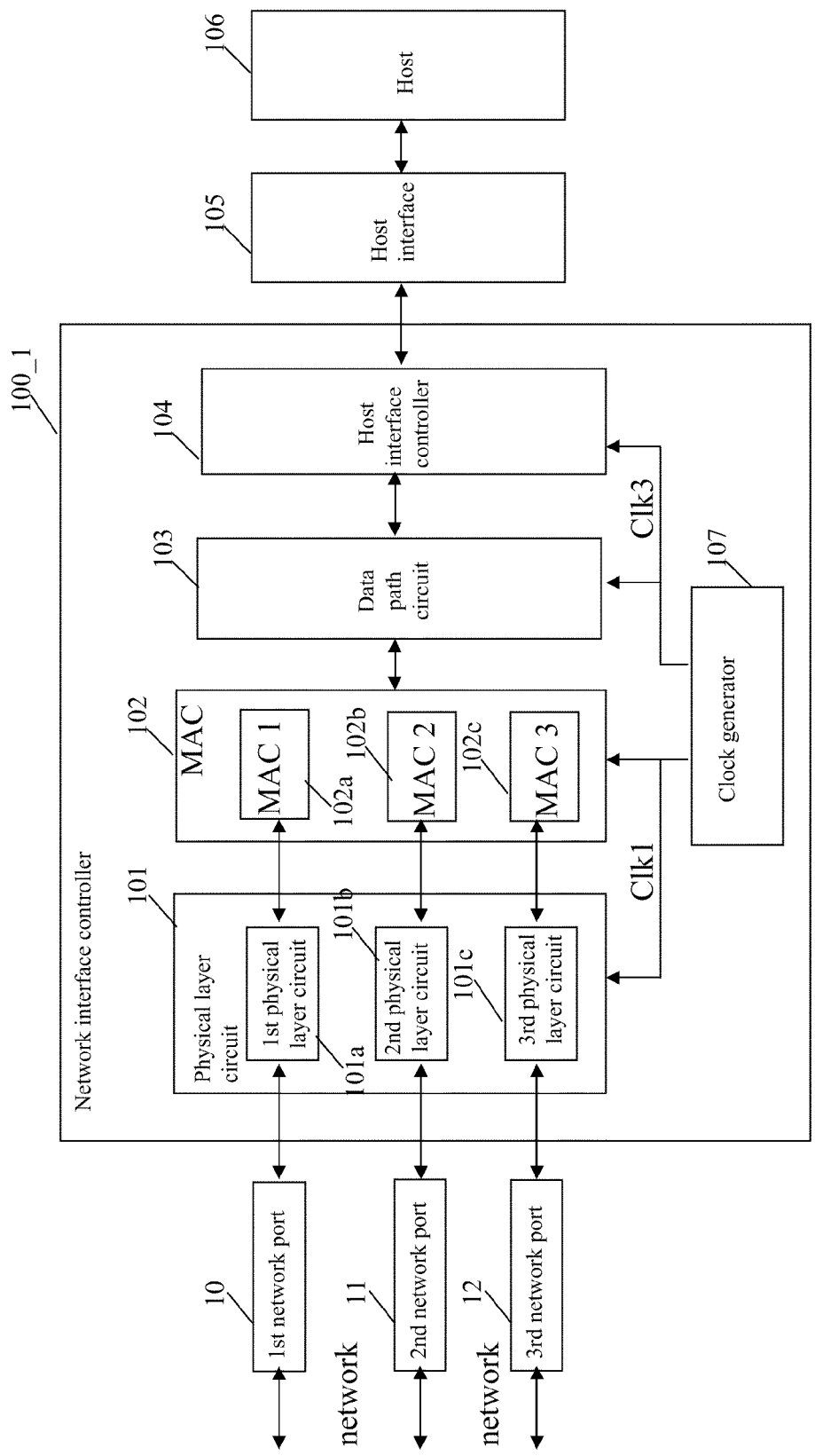
FIG. 10 is a block diagram of another embodiment of the network interface controller shown in FIG. 1.
Figure 11:
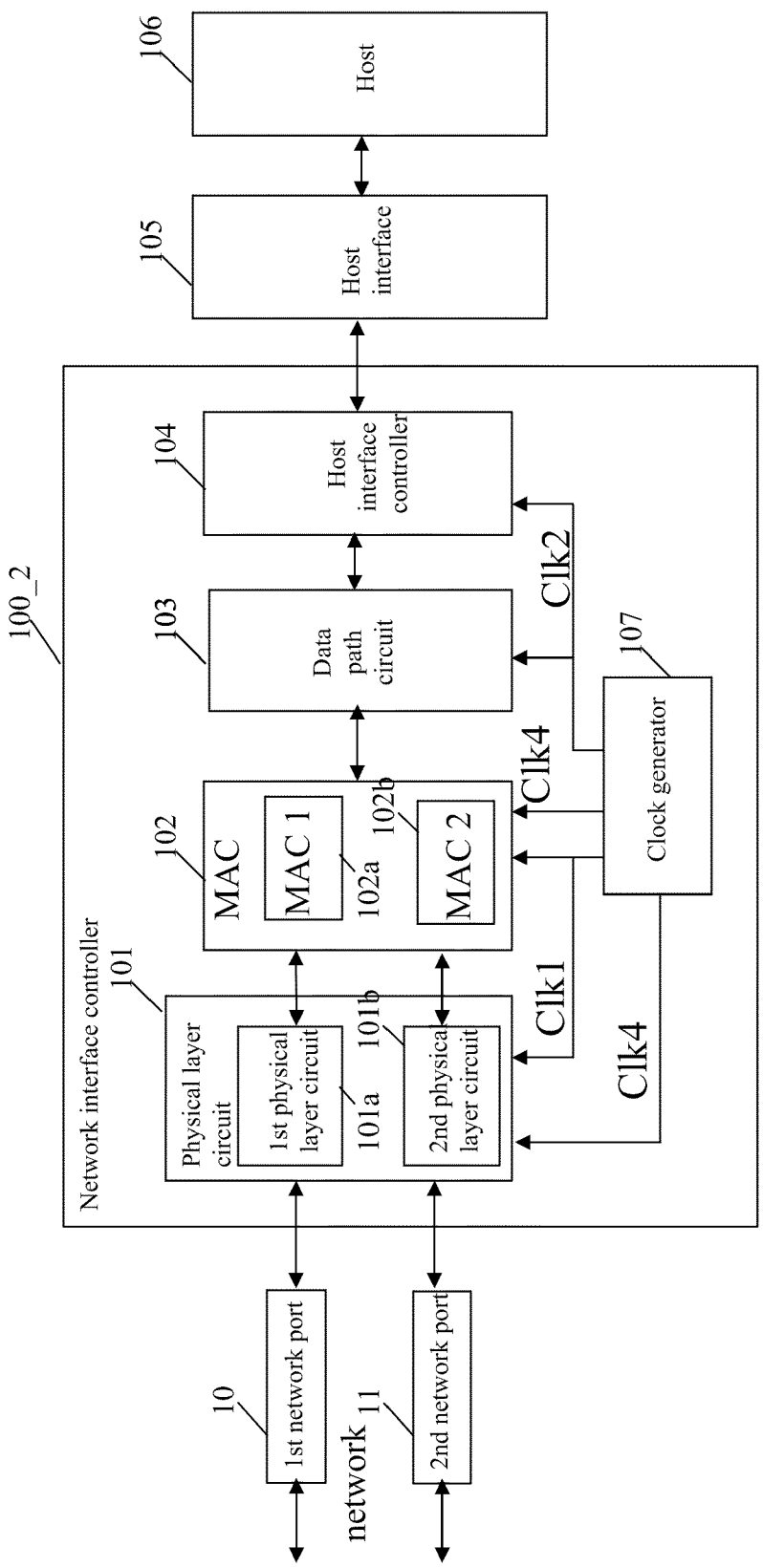
FIG. 11 is a block diagram of another embodiment of the network interface controller shown in FIG. 1.

In conclusion, the first embodiment of the invention provides a network controller to process data transmission and receipt between two physical network routes. However, data transmission and receipt of more physical network routes is still supported by the invention, as shown in FIG. 10. Please note that, frequency of the third clock Clk3 in FIG. 10 is triple or more of the first clock Clk1, and the data path circuit 103 compares the first, second, and third FIFO used space of the first, second, and third media access controller 102a, 102b, 102c with parameters such as destination addresses of data waiting to be transmitted to determine the coupling relationship of the host interface controller 104 and the first, second, and third FIFOs. Besides, it is possible that the frequency of the first physical network route consisting of the first media access controller 102a, the first physical layer circuit 101a, and the first network port 10 is different from the second physical network route consisting of the second media access controller 102b, the second physical layer circuit 101b, and the second network port 11. As FIG. 11 shows, the first physical network route works according to the first clock Clk1 and the second physical network route works according to the fourth clock Clk4. In this embodiment, frequency of the second clock Clk2 is at least double to the higher one of the first clock Cllk1 and the fourth clock Clk4.

Second Embodiment

Figure 12:
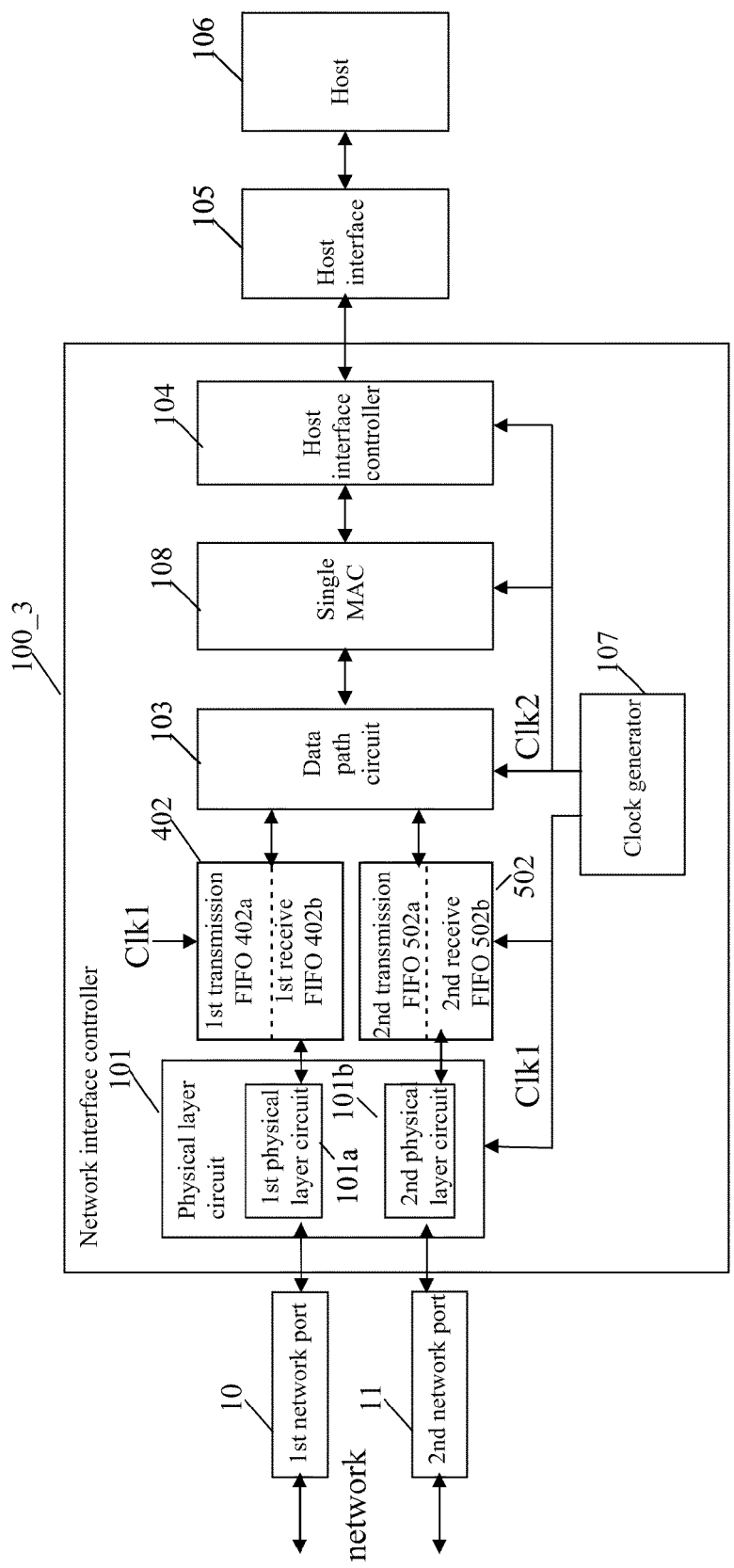
FIG. 12 is a block diagram of another embodiment of the network interface controller disclosed in the invention.

Please refer to FIG. 12, FIG. 12 is a block diagram of a second preferred embodiment of the network interface controller disclosed in the present invention. The network interface controller 100_3 includes a physical layer circuit 101, a first FIFO buffer 402, a second FIFO buffer 502, and a data path circuit 103, a single media access controller 108, a host interface controller 104, and a clock generator 107. The physical layer circuit 101 includes a first physical layer circuit 101a and a second physical layer circuit 101b, which the structure and function are both the same as the devices with the same name in the first preferred embodiment. So it is not necessary to discuss again. The first FIFO buffer 402 includes a first transmission FIFO 402a and a first receive FIFO 402b, whose structure and function are similar to the devices with the same name in the first preferred embodiment. The difference is the first FIFO buffer 402 of this embodiment is not installed inside the first media access controller 102a, instead, the first FIFO buffer 402 is applied as a buffer between the first physical layer circuit 101a and the data path circuit 103. The second FIFO buffer 502 includes a second transmission FIFO 502a and a second receive FIFO 502b, whose structure and function are similar to the devices with the same name in the first preferred embodiment. The difference is the second FIFO buffer 502 of this embodiment is not installed inside the second media access controller 102b, instead, the second FIFO buffer 502 is applied as a buffer between the second physical layer circuit 101b and the data path circuit 103. The structure and function of the data path circuit 103 are similar to the device with the same name in the first preferred embodiment. The difference is the data path circuit 103 of this embodiment couples to the first and second FIFO buffers 402, 502, and a single media access controller 108. Additionally, the data path circuit 103 of this embodiment determines transmission route according to package information of the media access controller. For example, when packet information includes a first MAC address, the data path circuit 103 determines coupling the first transmission FIFO 402a to transmit the package; when packet information includes a second MAC address, the data path circuit 103 determines coupling the second transmission FIFO 502a to transmit the package. The structure and function of the single media access controller 108 are similar to the first and second media access controller 102a, 102b disclosed in the first embodiment. The difference is the media access controller of the embodiment works according to a second clock Clk2. The media access controller includes a destination address identifier 602a just the same as the first embodiment to identify the destination address of data waiting to be transmitted, and supports an identification signal to a MAC address distributor. The MAC address distributor further attaches a first or second MAC address on data waiting to be transmitted to form a packet. The structure and function of the host interface controller 104 are similar to the device with the same name disclosed in the first embodiment. The difference is the host interface controller 104 of the embodiment couples to the single media access controller 108, not the data path circuit 103. The clock generator 107 supports a first clock Clk1 to the physical layer circuit 101 and the first and second FIFO buffers 402, 502, and supports a second clock Clk2 to the data path circuit 103, the media access controller, and the host interface controller 104, wherein the second clock frequency is twice or more than twice frequency of the first clock Clk1.

Figure 13:
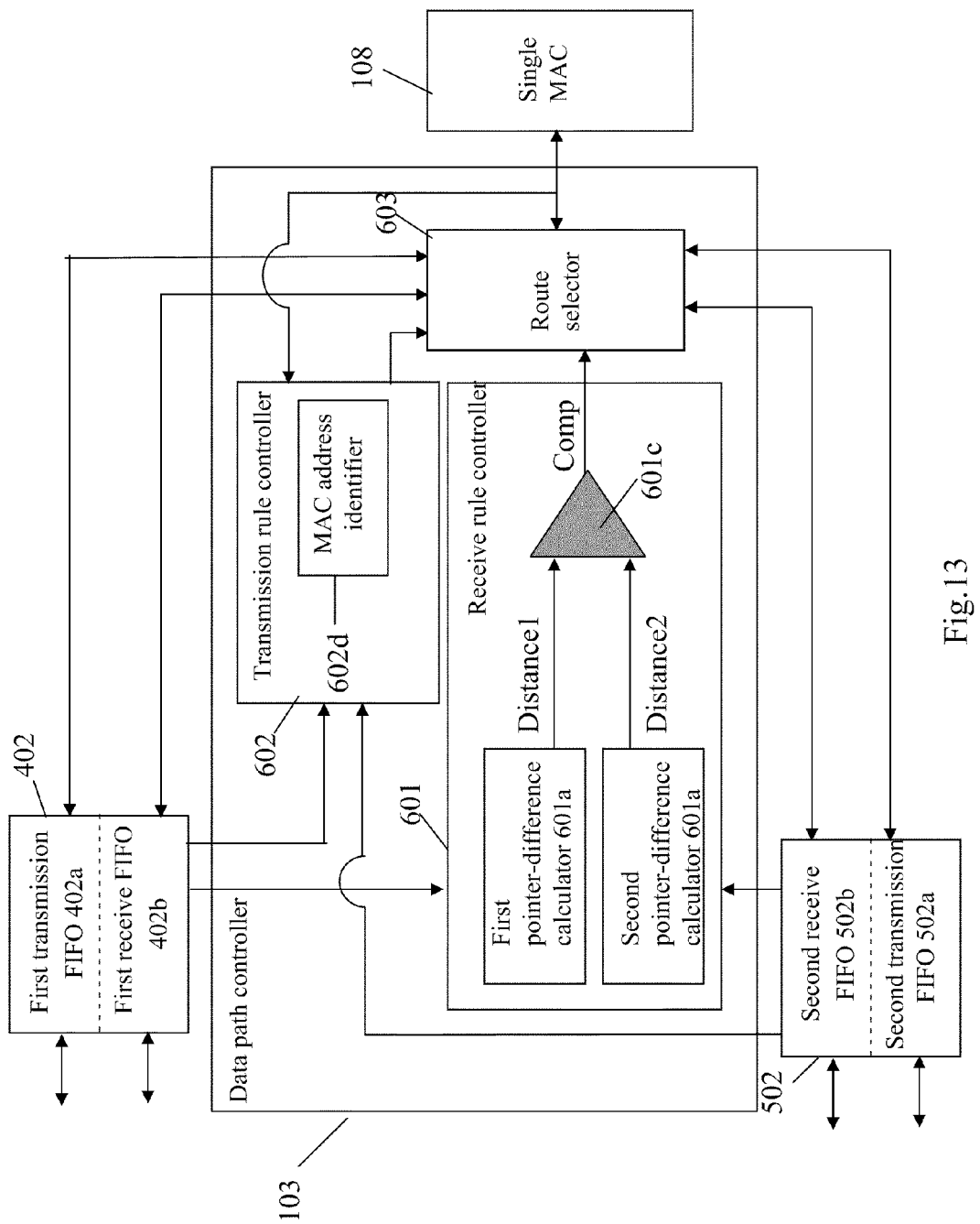
FIG. 13 is a block diagram of an embodiment of the data path circuit shown in FIG. 12.

A block diagram of the abovementioned data path circuit is shown in FIG. 13. The difference from the data path circuit 103 shown in FIG. 6 is at the transmission rule controller 602. Because the data path circuit 103 of this embodiment receives packets outputted by the single media access controller 108, wherein the packet already includes information about the first MAC address or the second MAC address. Therefore the transmission rule controller 103 just has to apply a MAC address identifier 602d for identifying the MAC address included by the packet to output a control signal to the route selector 603 to determine outputting the packet to the first or second FIFO buffer 402, 502.

Figure 14:
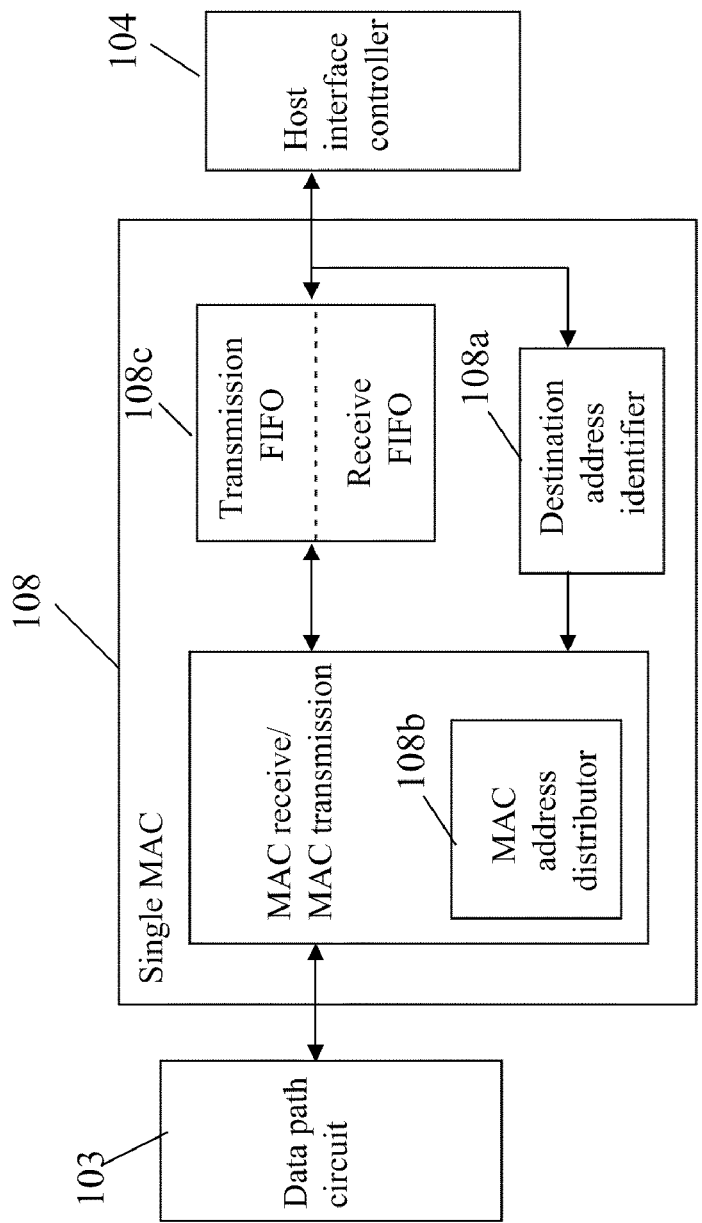
FIG. 14 is a block diagram of an embodiment of the single media access controller shown in FIG. 12.

Please refer to FIG. 14, FIG. 14 is a block diagram of one embodiment of the single media access controller 108. As FIG. 14 shows, the difference of the single media access controller 108 and the first media access controller 102a shown in FIG. 4 or the second media access controller 102b shown in FIG. 5 is that the single media access controller 108 further includes a destination address identifier 108a and a MAC address distributor 108b. The destination address identifier 108a is applied to identify the destination address of data waiting to be transmitted and then generates an identification signal. In this embodiment, the destination address identifier 108a is the same as the one discussed in the first preferred embodiment, stored an amount of destination addresses corresponding to the recent transmitted data. When the identification signal is a first digital value, it represents the destination address of data waiting to be transmitted is the same as the destination address of a previous data transmitted by the first FIFO buffer 402; when the identification signal is a second digital value, it represents the destination address of data waiting to be transmitted is the same as the destination address of a previous data transmitted by the second FIFO buffer 502; and when the identification signal is a third digital value, it represents the destination address of data waiting to be transmitted is not the same as the amount of destination addresses of a recent transmitted data. The MAC address distributors 108b determine to attach the first or second MAC address on data waiting to be transmitted to form a packet. When the identification signal is a first digital value, the MAC address distributor 108b attaches the first MAC address on the corresponding transmitting data to form a packet to transmit; when the identification signal is a second digital value, the MAC address distributor 108b attaches the second MAC address on the corresponding transmitting data to form a packet to transmit; and when the identification signal is a third digital value, the MAC address distributor 108b attaches one of the first and second MAC address on the corresponding transmitting data to form a packet to transmit by three types: randomly, by turns, or in accordance with a preset sequence. Furthermore, there is another difference to the first embodiment, the single media access controller 108 includes a FIFO buffer 108c. The FIFO buffer 108c includes a transmission FIFO and a receive FIFO, and is similar to the first FIFO buffer 402 shown in FIG. 4 and the second FIFO buffer 502 shown in FIG. 5. The difference is the FIFO buffer 108c is a synchronous buffer.

Figure 15:
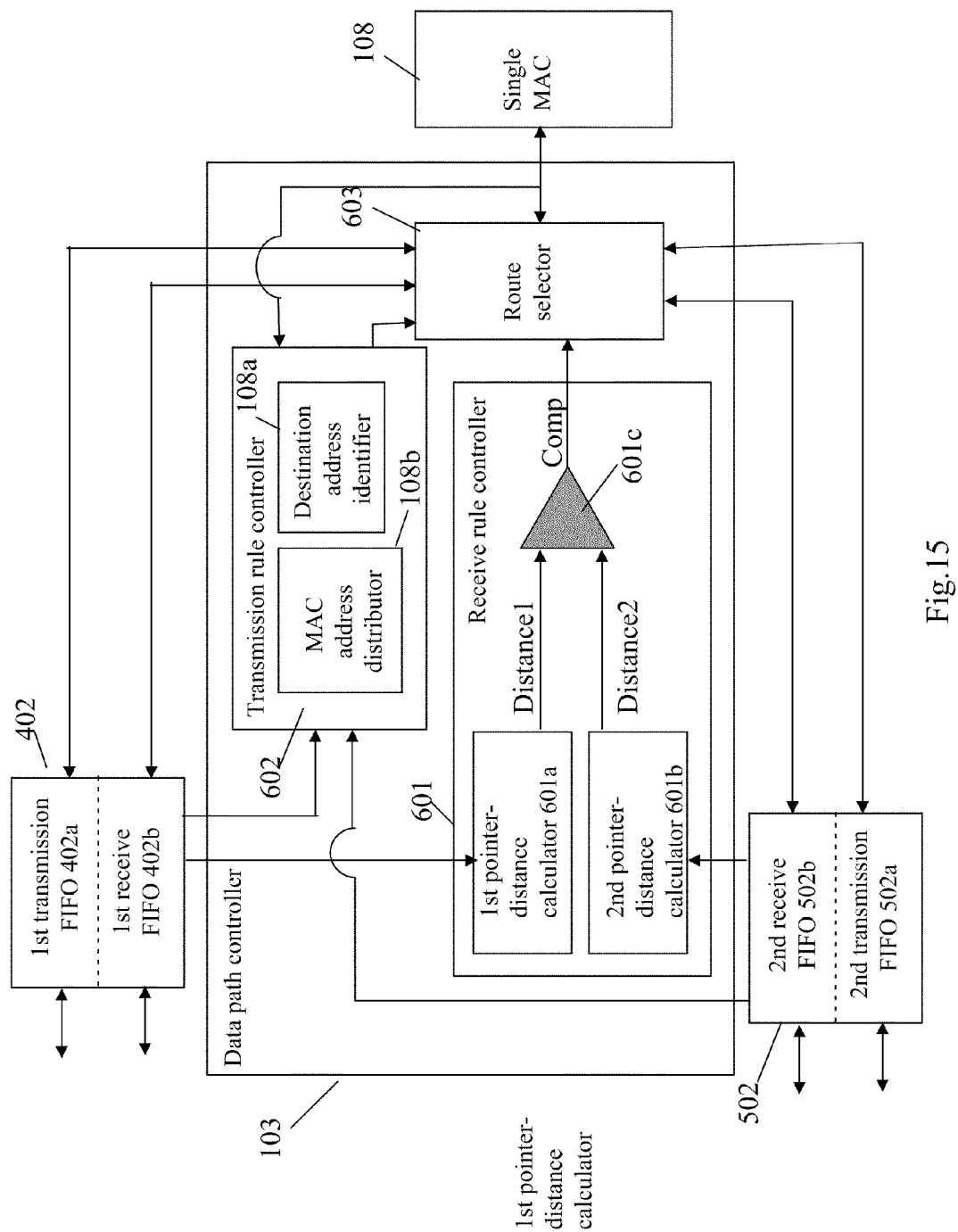
FIG. 15 is a block diagram of another embodiment of the data path circuit shown in FIG. 12.

Please note that, abovementioned destination address identifier 108a and MAC address distributor 108b are allowed to be installed in the transmission rule controller 602 of the data path circuit 103, as shown in FIG. 15. In this embodiment, the single media access controller 108 is the same as shown in FIG. 4 or FIG. 5. The outputted package includes an original MAC address and a destination address, and the destination address identifier 108a identifies the destination address included in the package waiting to be transmitted to generate the identification signal. The MAC address distributor 108b replaces the original MAC address of the packet waiting to be transmitted with the first or second MAC address according to the identification signal, and controls the route selector 603 outputting the packet which MAC address is replaced to the first or second transmission FIFO 402a, 502a.

Figure 16:
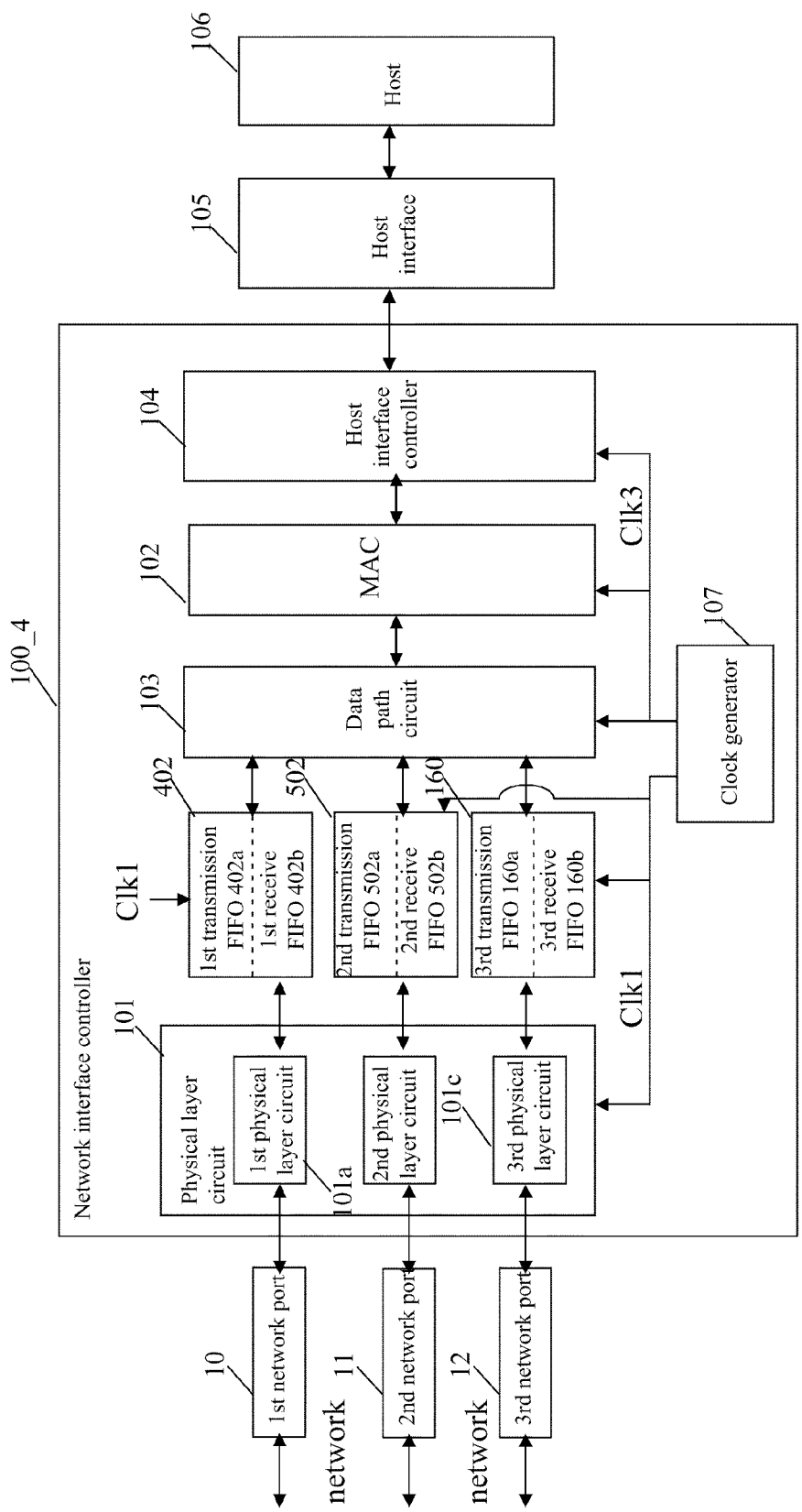
FIG. 16 is a block diagram of another embodiment of the network interface controller shown in FIG. 12.
Figure 17:
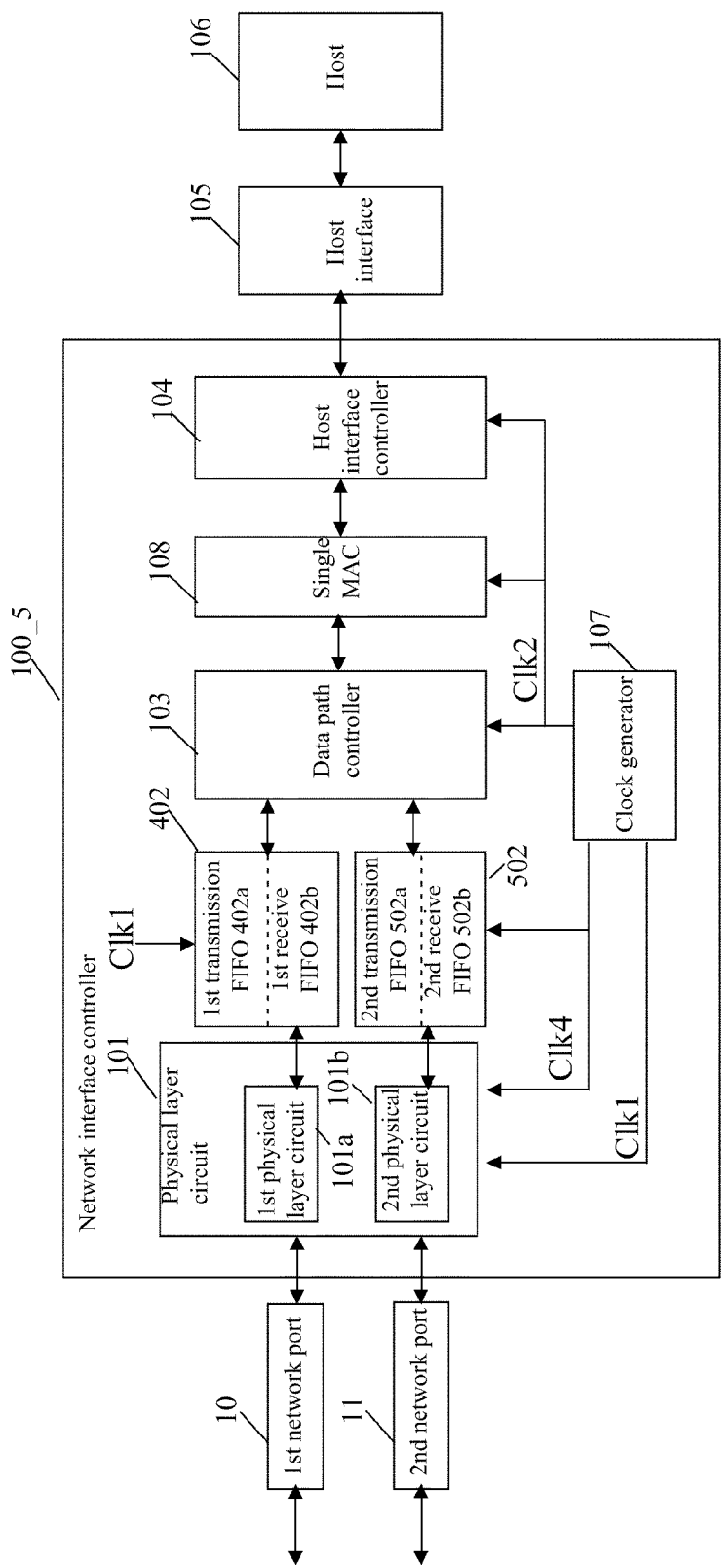
FIG. 17 is a block diagram of another embodiment of the network interface controller shown in FIG. 12.

In conclusion, the second preferred embodiment of this invention also supports a network controller to process data transmission and receipt of two physical network routes. However, similar to the first embodiment, data transmission and receipt of more than two physical network routes is also supported by the invention, as shown in FIG. 16. Besides, like the first embodiment, the first physical network route constructed by the first FIFO buffer 402, the first physical layer circuit 101a, and the first network port 10 is capable of working at different frequency to the second physical network route constructed by the second FIFO buffer 502, the second physical layer circuit 101b, and the second network port 11. As FIG. 17 shows, the first physical network route works at first frequency Clk1, and the second physical network route works at fourth frequency Clk4. In this embodiment, the second clock frequency is at least twice of the higher frequency of the first and fourth clocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network interface controller comprising:
a first physical layer circuit, for transmitting and receiving packets through a first network port;
a second physical layer circuit, for transmitting and receiving packets through a second network port;
a first media access controller, coupled to the first physical layer circuit, for generating packets to the first physical layer circuit in accordance with a destination address corresponding to data waiting for transmission, and processing received packets from the first physical layer circuit according to a first MAC address;
a second media access controller, coupled to the second physical layer circuit, for generating packets to the second physical layer circuit in accordance with a destination address corresponding to data waiting for transmission, and processing received packets from the second physical layer circuit according to a second MAC address;
a data path circuit, coupled to the first and second media access controllers, for receiving data outputted by the first or second media access controller according to a receive rule, and transmitting data to the first or second media access controller according to a transmission rule; and
a host interface controller, coupled to the data path circuit, for receiving data outputted by the data path circuit and then transmitting the data to a host through a host interface, and downloading data from the host through the host interface and then outputting the data to the data path circuit.

2. The network interface controller of claim 1, further comprising:
a clock generator, for providing a first clock to the first physical layer circuit and the first media access controller, and providing a fourth clock to the second physical layer circuit and the second media access controller, and providing a second clock to the data path circuit and the host interface controller, wherein the second clock frequency is twice or more than twice frequency of the first clock.

3. The network interface controller of claim 2, wherein the fourth clock frequency equals to or less than the first clock frequency.

4. The network interface controller of claim 1, wherein a bandwidth of the host interface is larger than that of first physical layer circuit.

5. The network interface controller of claim 1, wherein the first physical layer circuit comprising:
a first transceiver, for transmitting and receiving packets through the first network port;
a first conversion circuit, for converting packets outputted by the first media access controller into a proper signal to be transmitted to the first transceiver;
a first media independent interface, being a communication interface between the first physical layer circuit and the first media access interface; and
a first automatic negotiation circuit, for determining one of a plurality of transmission rates of the first physical layer circuit.

6. The network interface controller of claim 1, wherein the first media access controller comprising:
a first MAC transceiver, for packetizing data which is waiting to be transmitted as a packet and transmitting the packet to the first physical layer circuit through the first media independent interface, and further for filtering a packet received by the first media independent interface to be outputted to the data path circuit; and
a first buffer, coupled to the first MAC transceiver and the data path circuit, comprising a first transmission buffer for temporarily storing the data which is waiting to be transmitted, and further comprising a first receive buffer for temporarily storing the filtered data, the first buffer is an asynchronous buffer and the access rate between the first buffer and the first MAC transceiver is associated with the first clock and the access rate between the first buffer and the dataflow controller is associated with the second clock.

7. The network interface controller of claim 1, wherein the first media access controller comprises a first transmission buffer and a first receive buffer, the second media access controller comprises a second transmission buffer and a second receive buffer, the data path circuit comprising:
a transmission rule controller, for generating a transmission control signal according to a transmission rule;
a receive rule controller, for generating a receive control signal according to a receive rule; and
a route selector, for alternatively coupling the first transmission buffer or the second transmission buffer to the host interface controller according to the transmission control signal, and coupling the first receive buffer or the second receive buffer to the host interface controller according to the receive control signal.

8. The network interface controller of claim 7, wherein the transmission rule controller comprising:
a destination address identifier, for identifying a destination address of the data waiting to be transmitted in accordance with information provided by the host to generate the transmission control signal.

9. The network interface controller of claim 7, wherein the receive rule controller generates the receive control signal according to the using status of storage space of the first and second receive buffers.

10. The network interface controller of claim 9, wherein the receive rule controller further generating the receive control signal according to a timing signal.

11. A network interface controller comprising:
a first physical layer circuit, for transmitting and receiving packets through a first network port;
a second physical layer circuit, for transmitting and receiving packets through a second network port;
a first buffer, coupled to the first physical layer circuit, comprising a first transmission buffer for temporarily storing packets which are waiting to be transmitted to the first physical layer circuit, and further comprising a first receive buffer for temporarily storing packets received by the first physical layer circuit;
a second buffer, coupled to the second physical layer circuit, comprising a second transmission buffer for temporarily storing packets which are waiting to be transmitted to the second physical layer circuit, and further comprising a second receive buffer for temporarily storing packets received by the second physical layer circuit;
a data path circuit, coupled to the first and second buffers, for receiving packets outputted by the first buffer or the second buffer according to a receive rule, and transmitting packets to the first buffer or the second buffer according to a transmission rule;
a media access controller, coupled to the data path circuit, for generating packets to be outputted to the data path circuit according to data which is waiting to be transmitted, and filtering packets received by the data path circuit to output the data; and
a host interface controller, coupled to the media access controller, for receiving data filtered by the media access controller and then transmitting the data to a host through a host interface, and downloading data from the host through the host interface and then outputting the data to the media access controller.

12. The network interface controller of claim 11, further comprising:
a clock generator, for providing a first clock to the first physical layer circuit and the first buffer, and providing a fourth clock to the second physical layer circuit and the second buffer, and providing a second clock to the data path circuit, the media access controller, and the host interface controller, wherein the second clock frequency is twice or more than twice frequency of the first clock.

13. The network interface controller of claim 12, wherein the fourth clock frequency equals to or less than the first clock frequency.

14. The network interface controller of claim 11, wherein the host interface is a PCI Express interface.

15. The network interface controller of claim 11, wherein the first physical layer circuit comprising:
a first transceiver, for transmitting and receiving packets through the first network port;
a first conversion circuit, for converting packets outputted by the first buffer into a proper signal to be transmitted to the first transceiver;
a first media independent interface, being a communication interface between the first physical layer circuit and the first buffer; and a first automatic negotiation circuit, for determining one of a plurality of transmission rates of the first physical layer circuit.

16. The network interface controller of claim 11, wherein the first media access controller comprising:
a MAC transceiver, for packetizing data which is waiting to be transmitted as a packet and transmitting the package to the data path circuit, and further filtering a packet received by the data path circuit to be outputted to the host interface controller; and
a buffer, coupled to the first MAC transceiver and the host interface controller, comprising a transmission buffer for temporarily storing the data which is waiting to be transmitted, and further comprising a receive buffer for temporarily storing the filtered data.

17. The network interface controller of claim 16, wherein the media access controller further comprising:
a destination address identifier, for identifying a destination address of the data waiting to be transmitted and generating an identify signal; and
a MAC address distributor, for adding a first MAC address or a second MAC address on the data which is waiting to be transmitted as a packet according to the identify signal.

18. The network interface controller of claim 11, wherein the data path circuit comprising:
a transmission rule controller, for generating a transmission control signal according to a transmission rule;
a receive rule controller, for generating a receive control signal according to a receive rule; and
a route selector, for coupling the first transmission buffer or the second transmission buffer to the media access controller according to the transmission control signal, and coupling the first receive buffer or the second receive buffer to the media access controller according to the receive control signal.

19. The network interface controller of claim 18, wherein the transmission rule controller comprising:
a MAC address identifier, for identifying a MAC address of the packet waiting to be transmitted in accordance with information provided by the media access controller to generate the transmission control signal.

20. The network interface controller of claim 18, wherein the transmission rule controller comprising:
a destination address identifier, for identifying a destination address of the packet waiting to be transmitted and generating an identify signal; and
a MAC address distributor, for rewriting an original MAC address of the package waiting to be transmitted as a first MAC address or a second MAC address according to the identify signal, and applying the transmission control signal to command the route selector to transmit packet with the first MAC address to a first transmission FIFO or to transmit packet with the second MAC address to a second transmission FIFO.

21. The network interface controller of claim 18, wherein the receive rule controller generates the receive control signal according to the using status of storage space of the first and second receive buffers.

22. The network interface controller of claim 21, wherein the receive rule controller further generating the receive control signal according to a timing signal.

23. A single network interface device coupled to a computer host over a host interface, comprising:
a first physical layer circuit, for transmitting and receiving packets through a first network line;

a second physical layer circuit, for transmitting and receiving packets through a second network line;
a first network port, coupled between a first transceiver and the first network line;
a second network port, coupled between a second transceiver and a second network line;
a first buffer, coupled to the first physical layer circuit, for temporarily storing packets which are waiting to be transmitted to the first physical layer circuit and temporarily storing packets received by the first physical layer circuit;
a second buffer, coupled to the second physical layer circuit, for temporarily storing packets which are waiting to be transmitted to the second physical layer circuit and temporarily storing packets received by the second physical layer circuit; and
a host interface circuit, coupled to the first and second buffers, for allowing the first buffer or the second buffer to communicate with the computer host by the host interface, wherein the single network interface device controls packet transmission according to a transmission rule, and wherein the transmission rule makes the first and second transceivers load balance.

24. The single network interface device of claim 23, wherein the single network interface device controls packet receipt according to a receive rule.

25. A single network interface device coupled to a computer host over a host interface, comprising:
a first physical layer circuit, for transmitting and receiving packets through a first network line;
a second physical layer circuit, for transmitting and receiving packets through a second network line;
a first network port, coupled between a first transceiver and the first network line;
a second network port, coupled between a second transceiver and a second network line;
a first buffer, coupled to the first physical layer circuit, for temporarily storing packets which are waiting to be transmitted to the first physical layer circuit and temporarily storing packets received by the first physical layer circuit;
a second buffer, coupled to the second physical layer circuit, for temporarily storing packets which are waiting to be transmitted to the second physical layer circuit and temporarily storing packets received by the second physical layer circuit; and
a host interface circuit, coupled to the first and second buffers, for allowing the first buffer or the second buffer to communicate with the computer host by the host interface, wherein the first physical layer circuit comprises a first automatic negotiation circuit, for determining one of a plurality of transmission rates of the first physical layer circuit, and wherein the second physical layer circuit comprises a second automatic negotiation circuit, for determining one of a plurality of transmission rates of the second physical layer circuit.

26. The single network interface device of claim 23, wherein the single network interface device has a first MAC address and a second MAC address.

* * * * *